UNITED STATES PATENT OFFICE.

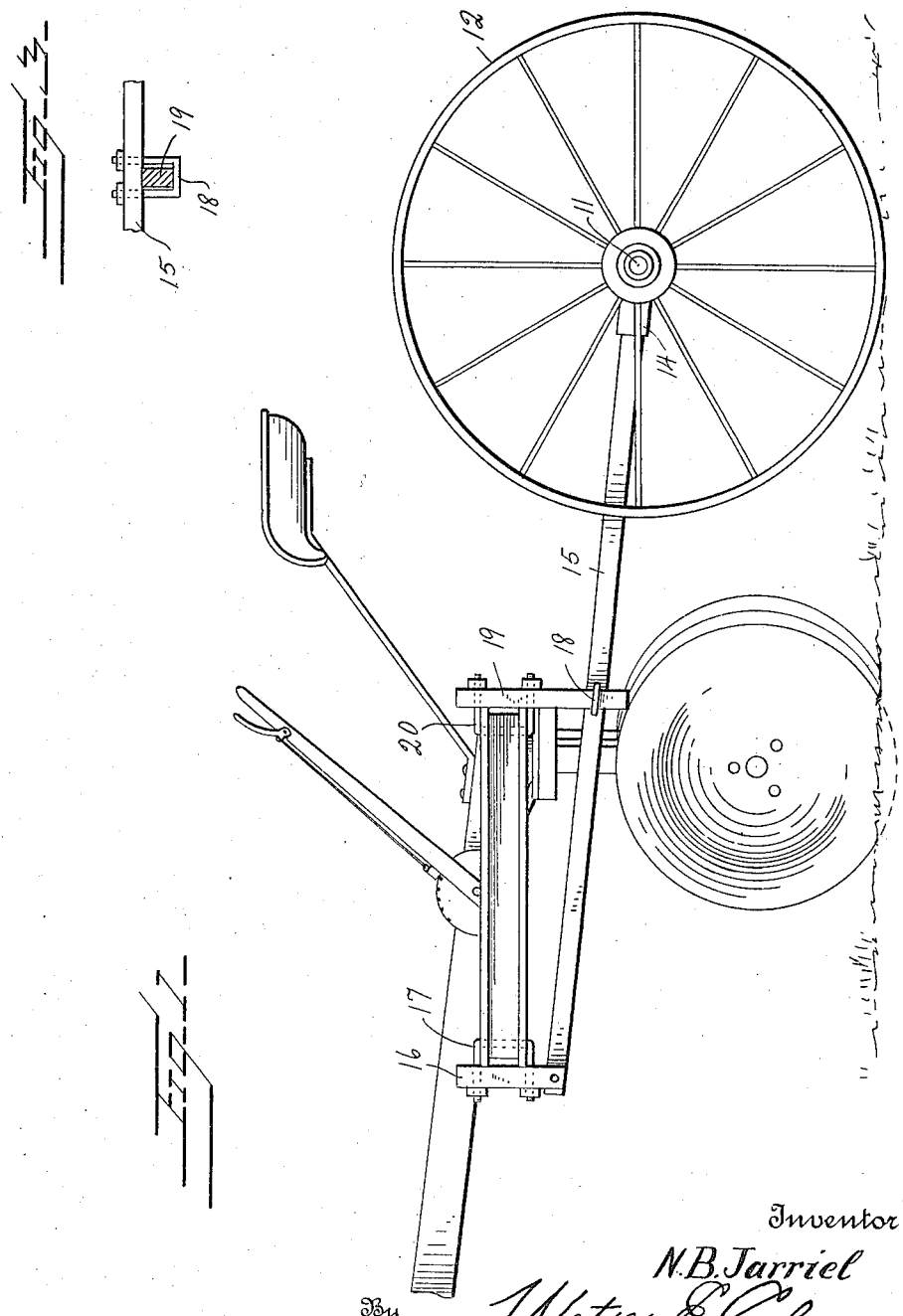

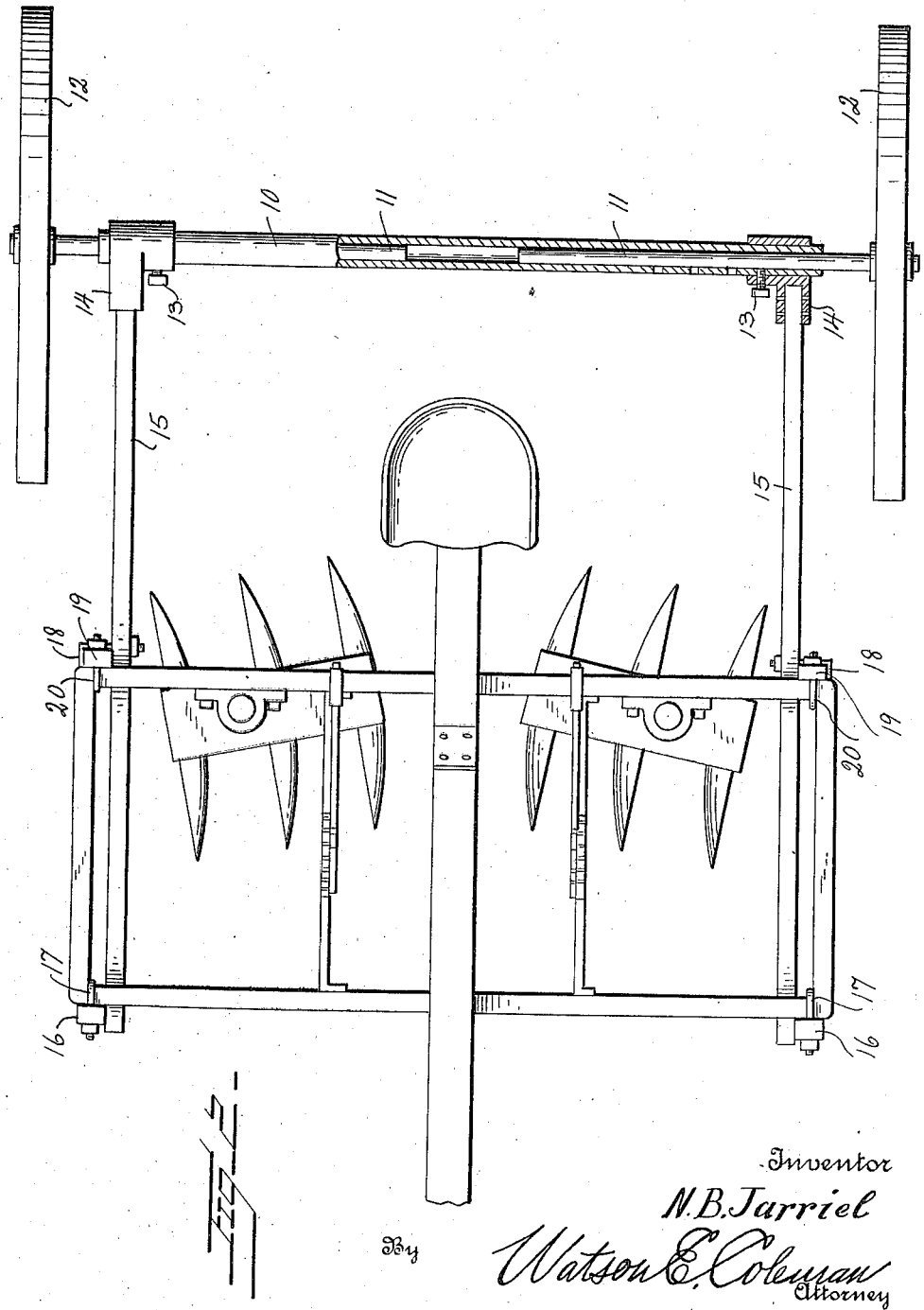

NATHAN B. JARRIEL, OF OHOOPEE, GEORGIA.

CULTIVATOR ATTACHMENT FOR HARROWS.

1,301,268. Specification of Letters Patent. Patented Apr. 22, 1919.

Application filed September 9, 1918. Serial No. 253,227.

*To all whom it may concern:*

Be it known that I, NATHAN B. JARRIEL, a citizen of the United States, residing at Ohoopee, in the county of Toombs and State of Georgia, have invented certain new and useful Improvements in Cultivator Attachments for Harrows, of which the following is a specification, reference being had to the accompanying drawings.

This invention relates to cultivator attachments, and particularly to means for converting a disk harrow or like implement into a cultivator.

The general object of the invention is to provide a very simple attachment which may be attached to a disk harrow for the purpose of converting a harrow into a cultivator which may be used for the cultivation of cotton, corn, or other like crops and particularly for bedding out or barring off crops of this character.

A further object of the invention is to provide a device of this character in the form of a truck which may be attached to the cultivator to act as a supporting truck therefor.

A further object is to provide a construction of this character which is so arranged that it may be applied to various different forms of harrows and which is further so constructed that the wheels of the truck may be variably adjusted to increase or decrease the wheel base.

Other objects will appear in the course of the following description.

My invention is illustrated in the accompanying drawings, wherein:—

Figure 1 is a side elevation of a cultivator with my attachment applied thereto;

Fig. 2 is a top plan view partly in section;

Fig. 3 is a fragmentary top plan view of a portion of the bar 15 and the U-bolt 18, the bracket 19 being in section.

My attachment comprises a sleeve 10 which constitutes an axle and in which are disposed the wheel spindles 11, these spindles being slidably mounted within the sleeve so that the wheels 12 may be adjusted toward or from each other and the spindles being held in their adjusted position by means of set screws 13.

Mounted upon the axle are the cast iron brackets 14 which are held stationary upon the axle by means of the set screws 13 previously referred to and mounted upon these brackets 14 are the forwardly extending bars 15. Pivotally connected to the forward ends of these bars are the clamping brackets 16 which are provided with the U-shaped clamping bolts 17 adapted to be engaged with the forward frame bar of an ordinary disk cultivator. Extending through the bars 15 are the clamping U-bolts 18 through which pass the brackets or supporting bars 19, these brackets or bars 19 being vertically adjustable within the U-shaped bolts 18. The extremities of these brackets 19 carry the U-bolts 20 for engagement with the rear cross bar of the frame of the harrow. The bars 15 are angularly adjustable relative to the axle. The bars 15 are clamped to the brackets 19 by the clamp bolts 18 so as to adjust the depth that the harrow is to cut.

This device may be applied in the manner illustrated to any harrow and by adjusting the distance between the wheels 12, the attachment may be adjusted to any desired width, as for instance, to the width of a six disk or eight disk harrow as the case may be.

When my device is attached to a disk harrow, as illustrated in Fig. 1, the harrow is so supported that it forms a cultivator and is particularly useful in bedding out or barring off cotton or other like crops. The disks can be reversed and the dirt turned back to the corn or cotton of the two first plowings. The device may be used on any crop that needs the dirt to be plowed away from it before it is worked and not only will it roll the dirt away from the plants being cultivated, but the disks will cut up bean vines, grass or other humus that has been turned under. With this attachment the harrow will follow the rows perfectly and not only can it be easily handled, but it enables the farmer to work a row at one trip instead of necessitating two workings, as at present. The device keeps the harrow from going too deep when the disks are thrown around far enough to cut up the humus and throw the dirt away.

I claim:—

1. A device of the character described comprising an axle formed with a tubular sleeve, traction wheels, spindles carrying the traction wheels and adjustable in said sleeve, bars forwardly extending from the sleeve and adjustably connected thereto, and forward and rear pairs of brackets adapted to be engaged with and clamped on the frame of a harrow.

2. A device of the character described comprising an axle formed with a tubular sleeve, traction wheels, spindles carrying the traction wheels and adjustable in said sleeve, bars forwardly extending from the sleeve and adjustably connected thereto, a forward pair of brackets attached to said bar and pivoted thereto, U-bolts attached to said forward brackets and adapted to engage the forward cross bar of a harrow frame, U-bolts passing through said first named bars, brackets clamped by said U-bolts and adjustable upon the first named bars, and U-bolts attached to said last named brackets and adapted to clamp the rear transverse bar of a harrow frame.

In testimony whereof I hereunto affix my signature in the presence of two witnesses.

N. B. JARRIEL.

Witnesses:
C. A. ROGERS,
G. W. LAMFORD.

Copies of this patent may be obtained for five cents each, by addressing the "Commissioner of Patents, Washington, D. C."